United States Patent [19]

Nebelung et al.

[11] Patent Number: 4,659,358

[45] Date of Patent: Apr. 21, 1987

[54] MOULD ARRANGEMENT OF A GLASSWARE FORMING MACHINE

[75] Inventors: Hermann H. Nebelung, Zurich; Fritz Futterknecht, Oetwil am See, both of Switzerland

[73] Assignee: Emhart Industries, Inc., Farmington, Conn.

[21] Appl. No.: 837,617

[22] Filed: Mar. 6, 1986

[30] Foreign Application Priority Data

Mar. 19, 1985 [GB] United Kingdom ............... 8507076

[51] Int. Cl.$^4$ ............................................. C03B 9/40
[52] U.S. Cl. ..................................... 65/360; 65/357; 65/359
[58] Field of Search ............... 65/357, 359, 360, 361, 65/163, 160

[56] References Cited

U.S. PATENT DOCUMENTS

| | | | |
|---|---|---|---|
| 3,370,322 | 2/1968 | Nowicki | 65/357 X |
| 4,543,118 | 9/1985 | Nebelung | 65/357 X |
| 4,557,746 | 12/1985 | Braithwaite et al. | 65/163 |
| 4,596,591 | 6/1986 | Nebelung et al. | 65/360 X |

Primary Examiner—Arthur Kellogg
Attorney, Agent, or Firm—H. Samuel Kieser

[57] ABSTRACT

Mould portions supporting arms of a mould arrangement are moved by drive means between mould-open and mould-closed conditions. The drive means comprises two vertical drive shafts (20) connected to the supporting arms and arranged to move the arms when turned in opposite directions by motor means (40). The motor means (40) is connected to the drive shafts (20) by connecting means comprising a driving pulley (70) driven by the motor and two driven pulleys (72 and 74) mounted on the shafts (20). The pulleys are interconnected by belts (76, 78, 80 and 82) whose ends are attached to the pulleys. During motion in each direction, two of the belts move the driven pulleys and hence turn the shafts (20) while the other two belts act to maintain tension in the first-mentioned belts.

7 Claims, 3 Drawing Figures

MOULD ARRANGEMENT OF A GLASSWARE FORMING MACHINE

BACKGROUND OF THE INVENTION

This invention is concerned with a mould arrangement of a glassware forming machine operable to shape molten glass in a mould. Such mould arrangements are commonly used in glassware forming machines of the individual section type.

In a glassware forming machine of the individual section type, a number of sections each of which forms a glassware forming unit are arranged side-by-side to receive gobs of molten glass from a gob distributor which supplies gobs to each section in turn. The sections operate to form the gobs into articles of glassware which are fed to a common conveyor. Each section comprises a mould arrangement operable to form gobs of molten glass into parisons and a further mould arrangement operable to form parisons into articles of glassware.

This invention is applicable both to mould arrangements for forming gobs into parisons and to mould arrangements for forming parisons into articles of glassware.

In the mould arrangements of a conventional glassware forming machine of the individual section type, the arrangement comprises a vertically projecting shaft on which two mould portion supporting arms of the mould arrangement are pivotally mounted for movement in opposite directions to open and close moulds formed by mould portions mounted on the mould portion supporting arms. Two vertically-extending drive shafts form part of drive means for causing the mould portion supporting arms to move to open and close the moulds. Each drive shaft is connected by link means to an associated one of the supporting arms so that, when the shaft is turned about its vertical axis, the supporting arm is moved to open or close a mould. Each drive shaft has a splined lower end portion which is received in a complementary recess of a link member which is pivotally mounted on the base plate of the machine. The two link members are connected by further links to a lever of the drive means which is pivotally mounted on the base plate for movement about a vertical axis. This lever is also connected to motor means operable to cause the lever to turn about its vertical axis which in turn causes the link members to pivot and the drive shafts to turn about their vertical axes so that the mould portion supporting arms are moved.

In a conventional mould arrangement as described in the last preceding paragraph, the connecting means, comprising the link members which connect the drive shafts to the lever connected to the motor means, is bulky and heavy and a substantial area is required in which to allow the link members to pivot around their pivot points to cause movement of the drive shafts.

It is an object of the present invention to provide a mould arrangement of a glassware forming machine in which the connecting means is lighter, less bulky and requires less space in which to operate.

BRIEF SUMMARY OF THE INVENTION

The invention provides a mould arrangement of a glassware forming machine operable to shape molten glass in a mould, the mould arrangement comprising mould portion supporting arms, which are movable to move mould portions supported thereby to open and close the mould, the arrangement also comprising drive means operable to move the supporting arms as aforesaid, the drive means comprising two vertically-extending drive shafts each mounted for turning movement about a vertical axis thereof, each drive shaft being connected to an associated one of the supporting arms so that, when the shaft is turned about its vertical axis, the supporting arm is moved to open or close the mould, connecting means connecting the shafts so that the shafts turn together about their respective axes through equal angles in opposite directions, and a motor means operable to turn the shafts about their respective axes to move the supporting arms as aforesaid, wherein the connecting means comprises a cylindrical driving pulley and first and second cylindrical driven pulleys, said first and second driven pulleys being of the same diameter and mounted one on each drive shaft, and four belts interconnecting the pulleys, each of the belts having an end portion attached to the driving pulley and an opposite end portion attached to one of said first and second driven pulleys, the first belt passing clockwise around a portion of the circumference of the driving pulley from its point of attachment thereto, extending between the driving pulley and the first driven pulley tangentially to both pulleys, and passing clockwise around a portion of the circumference of the first driven pulley to its point of attachment thereto, the second belt passing anti-clockwise around a portion of the circumference of the driving pulley from its point of attachment thereto and passing anti-clockwise around a portion of the circumference of the first driven pulley to its point of attachment thereto, said first and second belts extending parallel to one another between the pulleys and having substantially equal tensions, the third belt passing anti-clockwise around a portion of the circumference of the driving pulley from its point of attachment thereto, extending between the driving pulley and the second driven pulley, tangentially to both pulleys and passing clockwise around a portion of the circumference of the second driven pulley to its point of attachment thereto, and the fourth belt passing clockwise around a portion of the circumference of the driving pulley from its point of attachment thereto and passing anti-clockwise around a portion of the circumference of the second driven pulley to its point of attachment thereto, said third and fourth belts having substantially equal tensions and being arranged so that, between the pulleys, one belt crosses under the other of said belts, the motor means being arranged to turn the driving pulley through a predetermined angle so that the belts cause the first and second pulleys and the drive shafts to turn in opposite directions.

The connecting means of a mould arrangement according to the invention is lighter, less bulky and requires less space in which to operate than the connecting means of conventional arrangements, since bulky links are not involved and space in which the links can pivot is, therefore, not required.

In order to assist in setting up the connecting means so that the belts have substantially equal tensions, the first and second belts may be attached to abutting cylindrical portions of the driving pulley or of the first driven pulley, which cylindrical portions are turnable relative to one another to tension the belts and are then clampable against relative turning movement, and the third and fourth belts may be attached to abutting cylindrical portions of the driving pulley or of the second driven pulley which are turnable and clampable in similar manner. The clamping may be achieved by the use of clamping screws.

The belt tensions may alternatively be equalised by arranging that the first and the second belts are attached to abutting cylindrical portions of the driving pulley or of the first driven pulley, one of said cylindrical portions being turnable relative to the other against the action of a spring which determines the tension of the belts, and the third and fourth belts are attached to abutting cylindrical portions of the driving pulley or of the second driven pulley one of which is turnable relative to the other against the action of a further spring which determines the tension of the third and fourth belts. This self-regulating arrangement is advantageous because unequal tensions caused by stretching of the belts are avoided.

Conveniently, the belts of the connecting means in a mould arrangement according to the invention may be made of steel having a thickness of 0.2 mm to 0.5 mm.

For ease of attachment of the belts to the pulleys, the end portions of the belts may be received in recesses in the pulleys and are clamped therein, the end portions being pre-shaped to conform to the shape of the recesses.

In a preferred mould arrangement according to the invention, the motor means comprises a rotary hydraulic motor comprising a cylinder and a piston movable within the cylinder, the piston having a screw-threaded connection with the cylinder such that, when the piston is moved along the cylinder, it is caused to turn about a longitudinal axis of the cylinder, the piston also having a connection with an output shaft of the motor such that, when the piston turns about the longitudinal axis of the cylinder, the output shaft turns. Preferably, the connection between the piston of the rotary hydraulic motor and the output shaft is a screw-threaded connection of opposite hand to the connection between the piston and the cylinder.

The drive shafts of a mould arrangement according to the invention can either be connected to the mould portion supporting arms by links in conventional manner or the mould portion supporting arms can be mounted on the drive shafts to turn therewith.

BRIEF DESCRIPTION OF THE DRAWINGS

There now follows a detailed description, to be read with reference to the accompanying drawings, of a mould arrangement of a glassware forming machine of the individual section type which is illustrative of the invention. It is to be understood that the illustrative mould arrangement has been selected for description by way of example and not of limitation of the invention.

In the drawings.

DETAILED DESCRIPTION OF PREFERRED EMBODIMENT OF THE INVENTION

Figure 1:
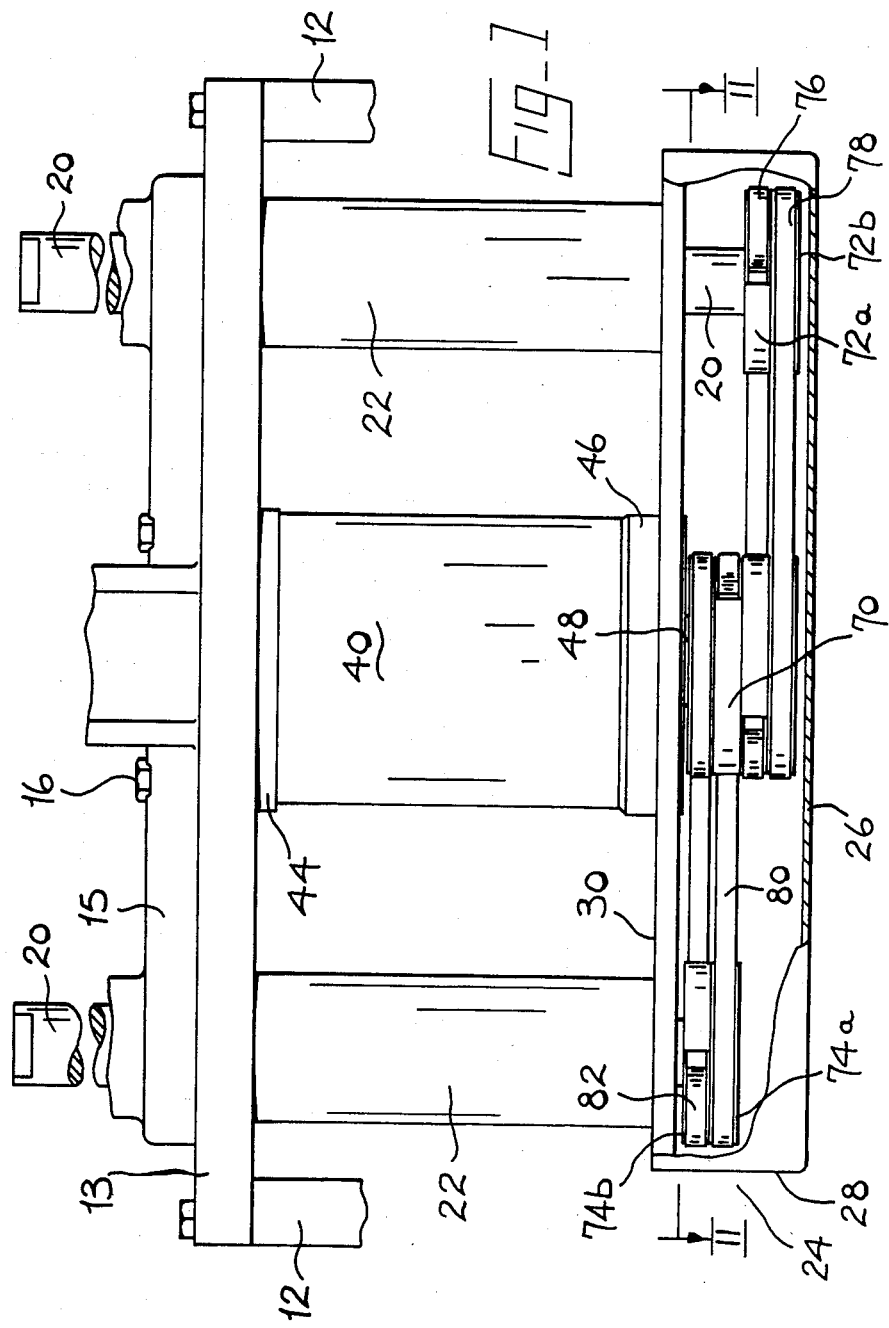
FIG. 1 is a front view, with parts broken away to show the construction, of a portion of the illustrative mould arrangement.

The illustrative mould arrangement shown in the drawings forms part of a section of a glassware forming machine of the individual section type. The mould arrangement is supported by a supporting frame and is operable to shape gobs of molten glass received by the section in a mould into parisons, although a generally similar mould arrangement may be operable to form parisons into articles of glassware. The supporting frame comprises vertically-extending walls 12 extending along opposite sides of the section and a horizontally-extending table 13 supported by the walls 12 and serving to support the illustrative mould arrangement.

The section of which the illustrative mould arrangement forms part also comprises a carrier member 15 mounted on top of the table 13 and secured thereto by screws 16. The carrier member 15 comprises an upwardly extending shaft (not shown) on which mould portion supporting arms of the mould arrangement are pivotally mounted in conventional manner. The mould portion supporting arms are not shown in the drawings but are movable to move mould portions supported thereby to open and close a mould of the mould arrangement in the operation of the section in a well-known manner, the supporting arms pivoting about the aforementioned shaft.

The illustrative mould arrangement also comprises drive means associated with the mould portion supporting arms and operable to move the supporting arms to pivot the arms about the shaft in opposite directions so that mould portions carried by the arms are moved together to close a mould or away from one another to open a mould. The drive means comprises two vertically-extending drive shafts 20 which extend downwardly through apertures in the table 13 and the carrier member 15 and are each mounted for turning movement about a vertical axis thereof. The drive means also comprises link means (not shown) of conventional type connecting each shaft to in associated one of the supporting arms so that, when the shaft 20 is turned about its vertical axis, the supporting arm is moved pivoting about the shaft to open or close the mould. Beneath the table 13 the drive shafts 20 extend downwardly within hollow cylindrical pillars 22 which contain bearings for the shafts 20 and also serve to support a box 24 which is, therefore, slung beneath the table 13. The box 24 has a base plate 26, sidewalls 28 and a top plate 30 secured to the pillars 22. The box 24 provides an enclosed structure the shape of which can be seen from FIG. 2.

The illustrative mould arrangement also comprises motor means operable to rotate a cylindrical driving pulley 70 to cause the mould to be opened or closed. The motor means comprises a rotary hydraulic motor arranged to rotate the driving pulley 70 through a predetermined arc. This motor is mounted on the underside of the table 13. The rotary hydraulic motor comprises a cylinder 40 which is secured to the underside of the table 13 by means of screws (not shown) which enter an end cap 44 of the cylinder 40. A lower end cap 46 of the cylinder 40 is mounted in a circular aperture in the top plate 30 of the box 24. The motor has an output shaft 48 on which the driving pulley 70 is mounted. Thus, when the drive shaft 48 is turned by operation of the motor, the driving pulley 70 is caused to rotate about its axis. The motor comprises a piston (not shown) movable within the cylinder 40 when hydraulic fluid under pressure is introduced into the cylinder 40. The piston has a screw-threaded connection with the cylinder 40 such that, when the piston is moved along the cylinder 40, it is caused to turn about a longitudinal axis of the cylinder. The piston also has a connection with the output shaft 48 of the motor which is connected to the driving pulley 70 so that, when the piston turns about the longitudinal axis of the cylinder, the driving pulley 70 turns about its vertical axis. This connection is made via the output shaft 48 which has an upper portion which is received in a cylindrical recess (not shown) in the piston and is connected to the piston by a screw-threaded connection of opposite hand to the connection between the piston and the cylinder 40. The arrangement of screw threaded connections of opposite hand causes the output shaft 48 to turn twice as quickly as the piston thereby allowing a more compact motor than if only one screw-threaded connection were present. The motor causes the driving pulley 70 to rotate for a predetermined arc, the length of the arc being determined by the stroke of the piston of the motor. The arc may, for example, be 55°.

The illustrative mould arrangement also comprises connecting means connecting the drive shafts 20 so that the shafts turn together about their respective axes through equal angles in opposite directions. The connecting means includes the driving pulley 70 and the motor means is operable, when it turns the pulley 70 to turn the shafts 20 about their respective axes to move the supporting arms as aforesaid. The connecting means also comprises first and second cylindrical driven pulleys 72 and 74 mounted one on each drive shaft 20 and four belts 76, 78, 80 and 82 interconnecting the pulleys. The pulleys 72 and 74 are of the same diameter but smaller than the pulley 70 and each of the belts has an end portion attached to the pulley 70 and an opposite end portion attached to one of said first and second pulleys 72 and 74. The belts are made of flexible but strong steel of a thickness between 0.2 mm and 0.5 mm and may for example be made of Sandvik 7C27MO2. The belts are displaced from one another transversely of the pulleys so that they do not foul one another. To enable this to be achieved the pulley 72 is mounted lower than the pulley 74 and its shaft 20 is longer than the other shaft 20.

The first belt 76 interconnecting the driving pulley 70 and the first driven pulley 72 has an end portion 76a attached to the driving pulley 70 and an opposite end portion 76b attached to the first driven pulley 72. The first belt 76 passes clockwise around a portion of the circumference of the driving pulley 70 from its point of attachment thereto, extends between the pulleys 70 and 72 tangentially thereto and passes clockwise around a portion of the circumference of the first driven pulley 72 to its point of attachment thereto. The second belt 78 has an end portion 78a attached to the driving pulley 70 and an opposite end portion 78b attached to the first driven pulley 72. The second belt 78 passes anti-clockwise around a portion of the circumference of the driving pulley 70 from its point of attachment thereto, extends between the pulleys 70 and 72 tangentially to both pulleys and passes anti-clockwise around a portion of the circumference of the first driven pulley 72 to its point of attachment thereto. The first belt 76 and second belt 78 have substantially equal tensions and run parallel to each other between the pulleys. The third belt 80 interconnects the driving pulley 70 with the second driven pulley 74. The third belt 80 passes anti-clockwise around a portion of the circumference of the driving pulley 70 from its point of attachment 80a thereto, extends between the pulleys 70 and 74 tangentially thereto and passes clockwise around a portion of the circumference of the second driven pulley 74 to its point of attachment 80b thereto. The fourth belt 82 also interconnects the driving pulley 70 and the second driven pulley 74 and passes clockwise around a portion of the circumference of the driving pulley 70 from its point of attachment 82a thereto, extends between the pulleys 70 and 74 tangentially thereto and passes anti-clockwise around a portion of the circumference of the second driven pulley 74 to its point of attachment 82b thereto. The third and fourth belts 80 and 82 have substantially equal tensions and the third belt 80 passes under the fourth belt 82 as they cross between the pulleys 70 and 74.

Figure 2:
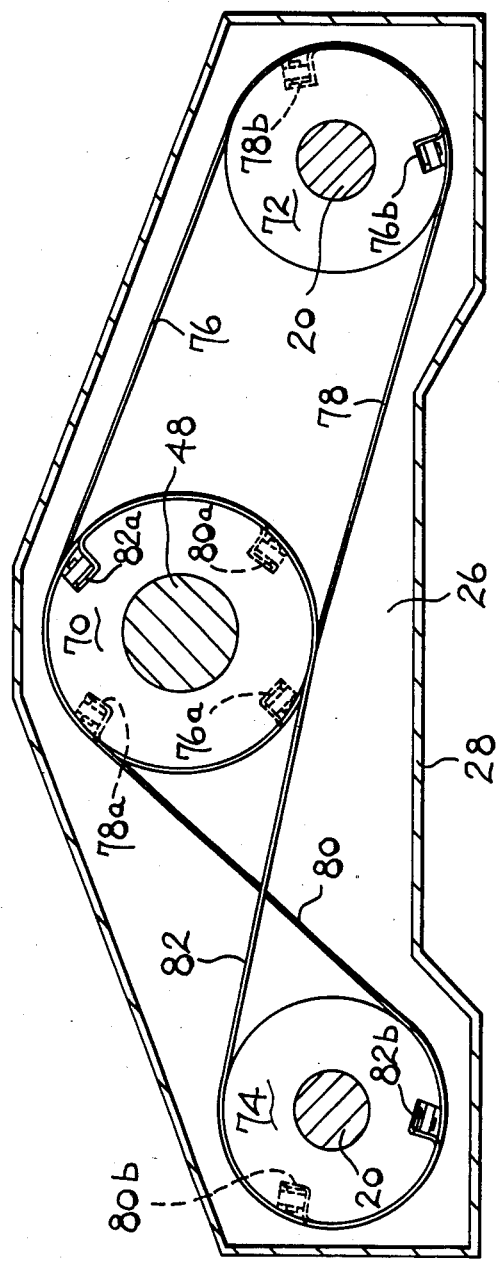
FIG. 2 is a cross-sectional view of the illustrative mould arrangement, taken on the line II—II in FIG. 1.

FIG. 2 shows the mid-position of the belts as the driving pulley 70 and first and second driven pulleys 72 and 74 turn between their end positions. The following paragraph describes the movement of the belts as the pulleys turn through a predetermined arc between first and second end positions thereof. The arc through which the pulleys 72 and 74 turn is greater than that of the pulley 70 because of the smaller diameter of the pulleys 72 and 74, the arc being 65°.

In the first end position of the pulleys 70, 72 and 74, which corresponds to the mould-open condition of the supporting arms, the belt 76 extends around a portion of the circumference of the driving pulley 70 and a portion of the pulley 72. The belt 76 extends around a relatively small portion of the circumference of the driving pulley 70 and a relatively large portion of the circumference of the pulley 72. In moving between the first end position to the mid-position (shown in FIG. 2), the pulley 70 is turned anti-clockwise and the belt 76 is wrapped on to the pulley 70 and is unwrapped from the pulley 72. In moving from this mid-position to the second end position which corresponds to the mould-closed position of the supporting arms, the belt 76 continues to wrap around the pulley 70 and continues to unwrap from the pulley 72. Thus, in the second end position (not shown) the belt 76 extends around a relatively large portion of the circumference of the pulley 70 and a relatively small portion of the circumference of the pulley 72. During this movement, the belt 78 serves to maintain the belt 76 in tension. During the movement, the belt 78 is unwrapped from the pulley 70 but is wrapped on to the pulley 72. During the return movement of the illustrative mould arrangement, in which the pulley 70 is turned clockwise, the roles of the two belts 76 and 78 are reversed so that the belt 78 causes the movement of the pulley 72 while the belt 76 serves to maintain the tension. The third and fourth belts 80 and 82 act in similar manner to the belts 76 and 78 but in relation to the pulleys 70 and 74, the difference being that, as the belts 80 and 82 cross one another, the pulley 74 turns in the opposite direction to the pulley 72. In moving between the first end position to the mid-position shown in FIG. 2, the belt 80 is wrapped onto the pulley 74 and is unwrapped from the pulley 70 which turns clockwise. In moving from this mid-position to the second end position, the belt 80 continues to wrap around the pulley 74 and continues to unwrap from the pulley 70. During this movement, the belt 82 serves to maintain the belt 80 in tension. During the movement, the belt 82 is unwrapped from the pulley 74 but is wrapped onto the pulley 70. During the return movement of the illustrative mould arrangement, the roles of the two belts 80 and 82 are reversed so that the belt 82 causes the movement of the second pulley 74 while the belt 80 serves to maintain the tension.

Figure 3:
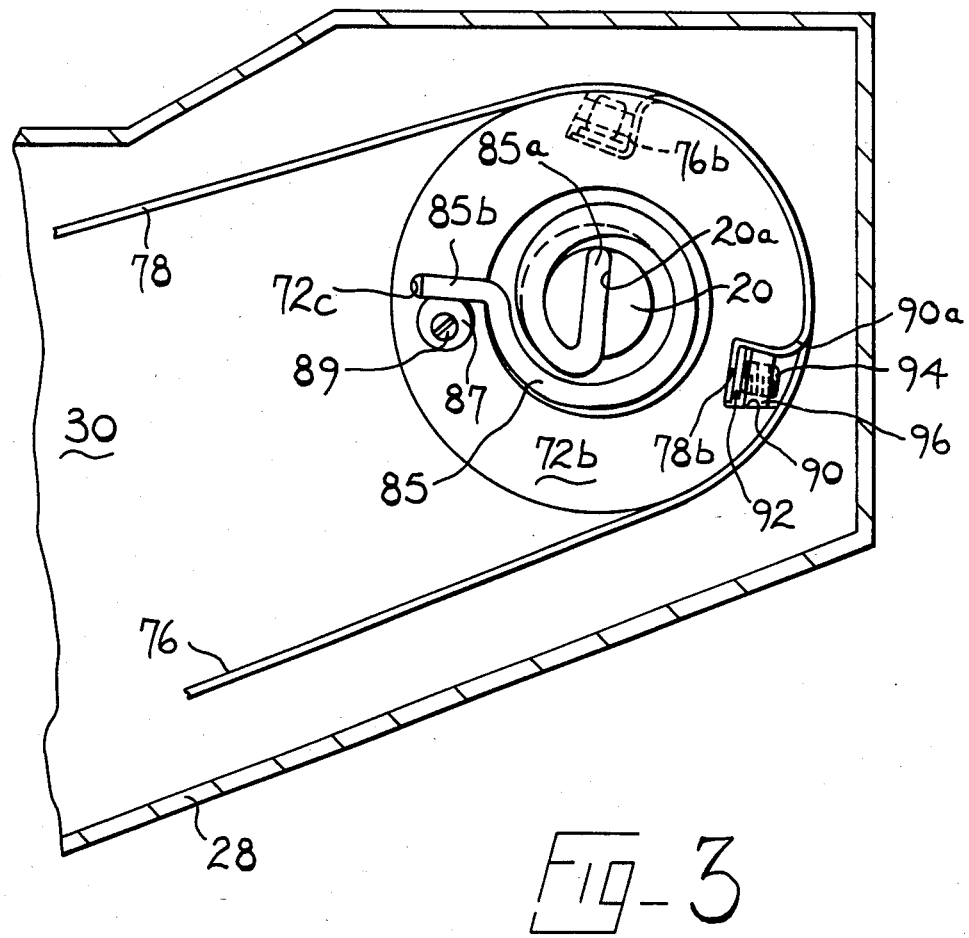
FIG. 3 is an underneath view of a first driven pulley of the illustrative mould arrangement, on a larger scale than FIGS. 1 and 2.

The construction of the first pulley 72 will now be described in more detail. The first pulley 72 comprises two abutting cylindrical portions, to one 72a of which the first belt 76 is secured and to the other 72b of which the second belt 78 is secured. One of the portions 72a is fixed directly to the shaft 20 while the other 72b is turnable relative to the portion 72a against the action of a spring 85 (see FIG. 3). The spring 85 is made of thick metal rod having one end 85a received in a slot 20a in the shaft 20. The other end 85b of the spring 85 is received in a slot 72c in the portion 72b and bears on a wedge 87 held by a screw 89 which enters the portion 72b. The spring 85 serves to tension the belts 76 and 78 by turning the portion 72b until the tensions of the belts 76 and 78 are equal. Once the tensions are equal, the portions 72a and 72b move as a unit. A similar spring (not shown) acts between portions 74a and 74b of the pulley 74 to equalize the tensions of the belts 80 and 82.

In mould arrangements similar to the illustrative mould arrangement, the turntable portions of the pulley used to equalise the belt tensions may be portions of the pulley 70 instead of portions of the pulleys 72 and 74. Furthermore, other arrangements may omit the springs and comprise clamping means in the form of clamping screws to clamp the portions of the pulley together against relative turning movement so that after the belts have been attached to both the pulleys, the turnable portion can be turned to give the correct tension to both belts and the two portions of the pulley may then be clamped.

The way in which the end portions 76a, 76b, 78a, 78b, 80a, 80b, 82a and 82b of the belts 76, 78, 80 and 82 are attached to the pulleys 70, 72 and 74 will now be described in more detail. Each of the end portions is attached to each of the pulleys in the same manner and is illustrated by the following description with reference to belt 78 and the driven pulley 72. At the point of attachment of the end portion 78b of the belt 78, a recess 90 is formed in the cylindrical surface of the driving pulley 70 (see FIG. 3). The recess 90 increases in width towards the bottom thereof and has a curved lip 90a over which the belt 78 passes to enter the recess 90. The end portion of the belt 78 is pre-shaped to pass over the lip 90a down the side of the recess 90 and across a flat bottom portion thereof. A plate 92 overlies the portion of the belt which extends across the bottom of the recess 90 and is held in clamping engagement with the belt 78 by two threaded studs 94 each of which has a lower narrower threaded portion (not shown) which passes through a hole in the plate 92 and the belt 78 and is received in a threaded recess in the pulley 72, and an upper threaded portion of larger diameter which engages the plate 92 and holds it in clamping engagement with the belt 78 and is also screw threaded. A wedge member 96 is threadedly received by both the studs 94 and serves to clamp the belt against the edge of the recess 90.

With the connecting means of the illustrative mould arrangement problems associated with backlash between gears and/or chains are avoided.

We claim:

1. A mould arrangement of a glassware forming machine operable to shape molten glass in a mould, the mould arrangement comprising mould portion supporting arms, which are movable to move mould portions supported thereby to open and close the mould, the arrangement also comprising drive means operable to move the supporting arms as aforesaid, the drive means comprising two vertically-extending drive shafts each mounted for turning movement about a vertical axis thereof, each drive shaft being connected to an associated one of the supporting arms so that, when the shaft is turned about its vertical axis, the supporting arm is moved to open or close the mould, connecting means connecting the shafts so that the shafts turn together about their respective axes through equal angles in opposite directions, and motor means operable to turn the shafts about their respective axes to move the supporting arms as aforesaid, wherein the connecting means comprises a cylindrical driving pulley and first and second cylindrical driven pulleys, said first and second driven pulleys being of the same diameter and mounted one on each drive shaft, and four belts interconnecting the pulleys, each of the belts having an end portion attached to the driving pulley and an opposite end portion attached to one of said first and second driven pulleys, the first belt passing clockwise around a portion of the circumference of the driving pulley from its point of attachment thereto, extending between the driving pulley and the first driven pulley tangentially to both pulleys, and passing clockwise around a portion of the circumference of the first driven pulley to its point of attachment thereto, the second belt passing anti-clockwise around a portion of the circumference of the driving pulley from its point of attachment thereto and passing anti-clockwise around a portion of the circumference of the first driven pulley to its point of attachment thereto, said first and second belts extending parallel to one another between the pulleys and having substantially equal tensions, the third belt passing anti-clockwise around a portion of the circumference of the driving pulley from its point of attachment thereto, extending between the driving pulley and the second driven pulley, tangentially to both pulleys and passing clockwise around a portion of the circumference of the second driven pulley to its point of attachment thereto, and the fourth belt passing clockwise around a portion of the circumference of the driving pulley from its point of attachment thereto and passing anti-clockwise around a portion of the circumference of the second driven pulley to its point of attachment thereto, said third and fourth belts having substantially equal tensions and being arranged so that, between the pulleys, one belt crosses under the other of said belts, the motor means being arranged to turn the driving pulley through a predetermined angle so that the belts cause the first and second pulleys and the drive shafts to turn in opposite directions.

2. A mould arrangement according to claim 1, wherein the first and the second belts are attached to abutting cylindrical portions of the driving pulley or of the first driven pulley, which cylindrical portions are turnable relative to one another to tension the belts and are then clampable against relative turning movement, and the third and fourth belts are attached to abutting cylindrical portions of the driving pulley or of the second driven pulley which are turnable and clampable in similar manner.

3. A mould arrangement according to claim 1, wherein the first and the second belts are attached to abutting cylindrical portions of the driving pulley or of the first driven pulley, one of said cylindrical portions being turnable relative to the other against the action of a spring which determines the tension of the belts, and the third and fourth belts are attached to abutting cylindrical portions of the driving pulley or of the second driven pulley one of which is turnable relative to the other against the action of a further spring which determines the tension of the third and fourth belts.

4. A mould arrangement according to claim 1, wherein the belts are made of steel having a thickness of 0.2 mm to 0.5 mm.

5. A mould arrangement according to claim 1, wherein the end portions of the belts are received in recesses in the pulleys and are clamped therein, the end portions being pre-shaped to conform to the shape of the recesses.

6. A mould arrangement according to claim 1, wherein the motor means comprises a rotary hydraulic motor comprising a cylinder and a piston movable within the cylinder, the piston having a screw-threaded connection with the cylinder such that, when the piston is moved along the cylinder, it is caused to turn about a longitudinal axis of the cylinder, the piston also having a connection with an output shaft of the motor such that, when the piston turns about the longitudinal axis of the cylinder, the output shaft turns.

7. A mould arrangement section according to claim 6, wherein the connection between the piston of the rotary hydraulic motor and the output shaft is a screw-threaded connection of opposite hand to the connection between the piston and the cylinder.

* * * * *